(12) United States Patent
Gonze et al.

(10) Patent No.: US 8,205,439 B2
(45) Date of Patent: Jun. 26, 2012

(54) ELECTRICALLY HEATED PARTICULATE FILTER WITH ZONED EXHAUST FLOW CONTROL

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 767 days.

(21) Appl. No.: 12/358,709

(22) Filed: Jan. 23, 2009

(65) Prior Publication Data

US 2010/0186385 A1 Jul. 29, 2010

(51) Int. Cl.
*F01N 3/00* (2006.01)
*F01N 3/10* (2006.01)
*F01N 1/00* (2006.01)
*B01D 46/00* (2006.01)

(52) U.S. Cl. ............... 60/286; 60/295; 60/297; 60/303; 60/324; 95/283

(58) Field of Classification Search .................. 60/273, 60/274, 286, 295, 297, 303, 311, 324; 95/278, 95/279, 283, 285
See application file for complete search history.

(56) References Cited

U.S. PATENT DOCUMENTS

| | | | | |
|---|---|---|---|---|
| 4,373,330 A | * | 2/1983 | Stark | 60/311 |
| 4,427,418 A | * | 1/1984 | Kogiso et al. | 55/287 |
| 4,505,107 A | | 3/1985 | Yamaguchi et al. | |
| 4,516,993 A | * | 5/1985 | Takeuchi et al. | 55/283 |
| 4,558,565 A | * | 12/1985 | Kojima et al. | 60/286 |
| 5,203,166 A | * | 4/1993 | Miller | 60/274 |
| 5,212,948 A | * | 5/1993 | Gillingham et al. | 60/288 |
| 6,090,172 A | | 7/2000 | Dementhon et al. | |
| 6,694,727 B1 | * | 2/2004 | Crawley et al. | 60/295 |

FOREIGN PATENT DOCUMENTS

JP  07-004230  10/1995

OTHER PUBLICATIONS

"Glossary," Custom Clinic, archived Feb. 4, 2001.*

* cited by examiner

*Primary Examiner* — Thomas Denion
*Assistant Examiner* — Audrey K Bradley

(57) ABSTRACT

A system includes a particulate matter (PM) filter that includes X zones. An electrical heater includes Y heater segments that are associated with respective ones of the X zones. The electrical heater is arranged upstream from and proximate with the PM filter. A valve assembly includes Z sections that are associated with respective ones of the X zones. A control module adjusts flow through each of the Z sections during regeneration of the PM filter via control of the valve assembly. X, Y and Z are integers.

20 Claims, 10 Drawing Sheets

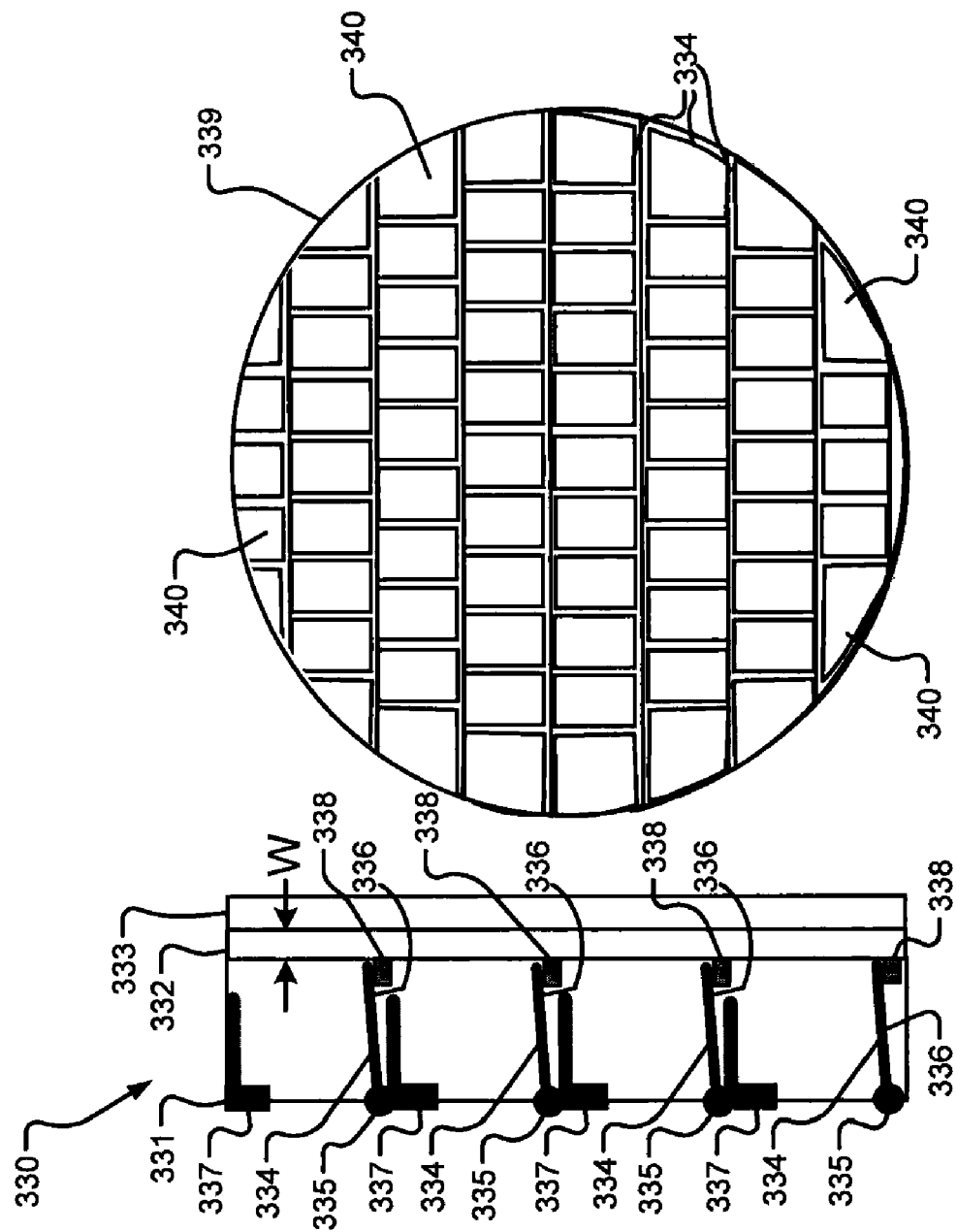

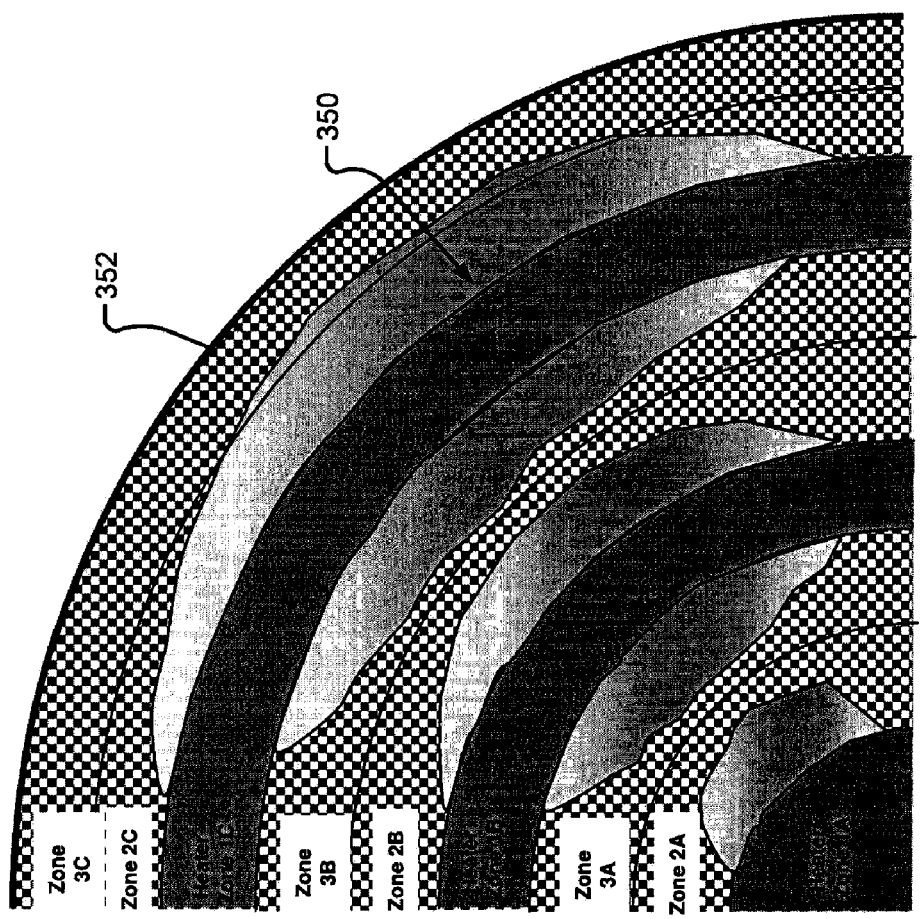

ELECTRICALLY HEATED PARTICULATE FILTER WITH ZONED EXHAUST FLOW CONTROL

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to engine control systems for internal combustion engines, and more particularly to particulate filter regeneration systems.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

PM reduction systems that use fuel tend to decrease fuel economy. For example, many fuel-based PM reduction systems decrease fuel economy by 5%. Electrically heated PM reduction systems reduce fuel economy by a negligible amount, but are operation limited based on exhaust flow. As exhaust flow increases, for example, above a particular flow rate (kg/s), the facilitation and ability to initiate regeneration by an electrically heated element decreases.

SUMMARY

In one embodiment, a system is provided that includes a particulate matter (PM) filter that includes X zones. An electrical heater includes Y heater segments that are associated with respective ones of the X zones. The electrical heater is arranged upstream from and proximate with the PM filter. A valve assembly includes Z sections that are associated with respective ones of the X zones. A control module adjusts flow through each of the Z sections during regeneration of the PM filter via control of the valve assembly. X, Y and Z are integers.

In other features, a method is provided that includes providing a particulate matter (PM) filter that includes X zones. An electrical heater is provided that includes Y heater segments that are associated with respective ones of the X zones. The electrical heater is arranged upstream from and proximate with the PM filter. Exhaust flow through a selected one of the X zones is restricted during regeneration of the PM filter. X and Y are integers.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A is a side view of a valve and heater element assembly in accordance with an embodiment of the present disclosure;

FIG. 3B is a front view of the valve and heater assembly of FIG. 3A;

FIG. 5 illustrates exemplary zoning of a zoned inlet heater assembly;

DETAILED DESCRIPTION

Figure 1:
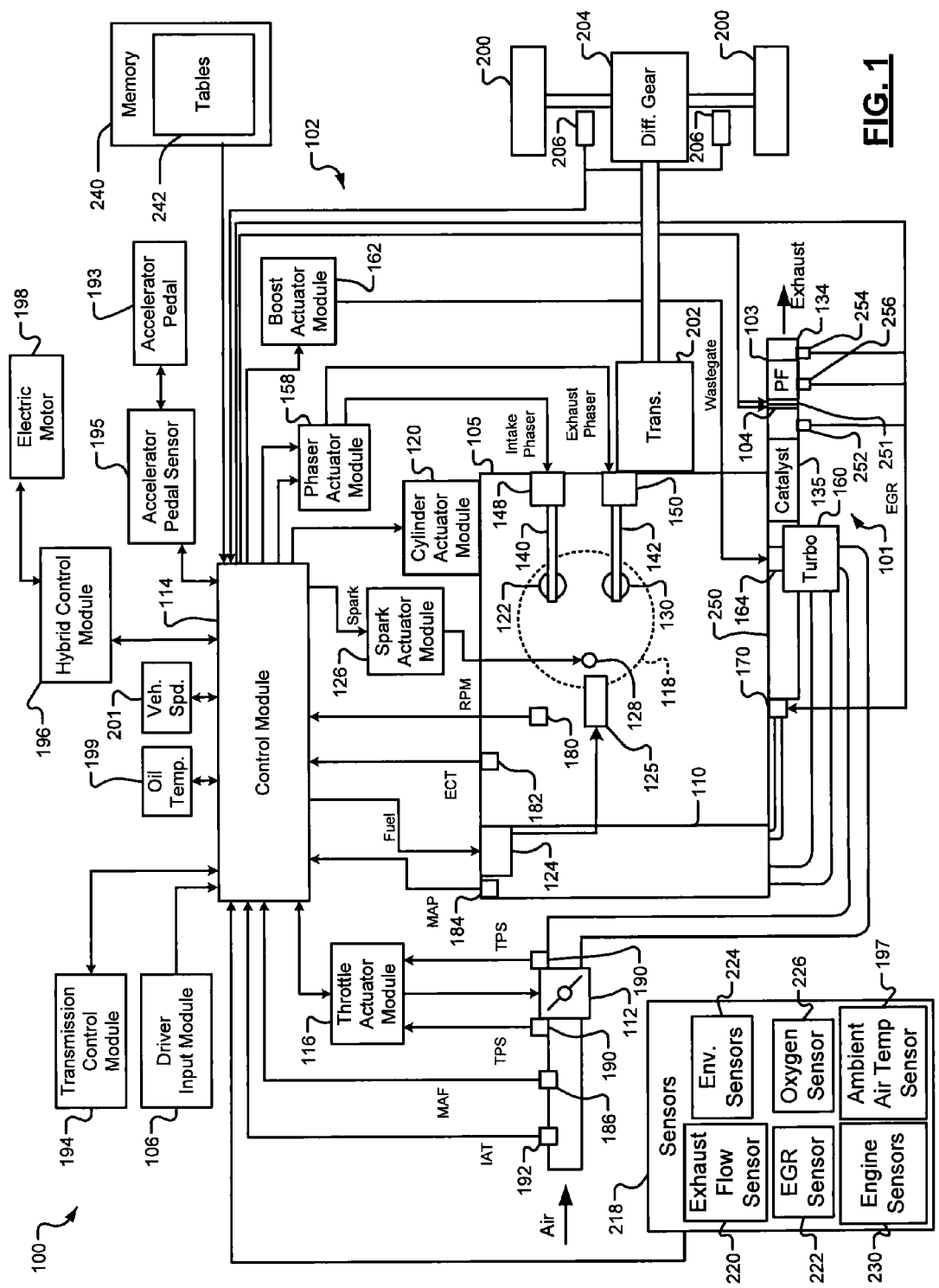
FIG. 1 is a functional block diagram of an engine system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other engines. For example, the present invention may apply to compression ignition, spark ignition, spark ignition direct injection, homogenous spark ignition, homogeneous charge compression ignition, stratified spark ignition, diesel, and spark assisted compression ignition engines.

In addition, in the following description terms, such as "first", "second", and "third" are used. These terms are not specific to any one device or element. More than one of the terms may be used to refer to the same device depending upon the context. For example, the terms first and second may be used to refer to the same module.

Furthermore, various sensors and parameters are disclosed herein. The parameters may be directly determined based on signals from the corresponding sensors or may be indirectly determined. When indirectly determined, the parameters may be based on signals from non-corresponding sensors, based on determined engine and/or exhaust system operating conditions, and/or based on predetermined values. For example, air flow across an external area of an exhaust system may be directly determined via an air flow sensor or may be estimated based on information from a vehicle speed sensor and/or other sensors.

Referring now to FIG. 1, a functional block diagram of an engine system 100 that incorporates a regeneration system 102 with a valve assembly 104 is shown. Although the following embodiment is directed to a hybrid vehicle, the embodiments disclosed herein may be applied to non-hybrid vehicles. The engine system 100 includes an exhaust system 101 with the regeneration system 102. The regeneration system 102 is used to remove particles in a particulate filter (PF) 103 of the exhaust system 101. The regeneration system 102 incorporates the valve assembly 104, which adjusts flow of exhaust into selected portions of the PF 103.

The engine system 100 includes an engine 105 that combusts an air/fuel mixture to produce drive torque for a vehicle based on a driver input module 106. Air is drawn into an intake manifold 110 through a throttle valve 112. A control module 114, which may be referred to as an engine control module, commands a throttle actuator module 116 to regulate opening of the throttle valve 112 to control the amount of air drawn into the intake manifold 110.

Air from the intake manifold 110 is drawn into the cylinder 118 through an intake valve 122. The control module 114 controls the amount, timing, and number of fuel injections into each cylinder of the engine 105 and during a combustion cycle via a fuel injection system 124 that includes one or more fuel injectors 125. A combustion cycle may refer to an intake stroke, a compression stroke, an ignition stroke and an exhaust stroke of a cylinder. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The fuel that is injected prior to an ignition stroke with the air and creates the air/fuel mixture in the cylinder 118. A piston (not shown) within the cylinder 118 compresses the air/fuel mixture. Based upon a signal from the control module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130 of the cylinder 118. The byproducts of combustion are exhausted from the vehicle via an exhaust system 101. Exhaust passes through an oxidation catalyst 135 and the PF 103. The embodiments disclosed herein may be applied to an aftertreatment system that includes an oxidation catalyst, a particulate filter, and/or other catalyst and aftertreament components. The oxidation catalyst 135 promotes oxidation of unburned fuel and raises the temperature of the exhaust gas using heat generated by an oxidation reaction.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A control module 114 may regulate the position of the intake valve 122 and/or the exhaust valve 130 to increase the quantity of fuel ingested into the cylinder(s) 118. The control module 114 may also adjust operation of the fuel injector(s) 125, such as ON time or size of injector openings, to increase the amount of fuel injected into the cylinder(s) 118. The control module 114 may also adjust the timing of the exhaust camshaft(s) corresponding to the change in the A/F mixture.

The time at which the intake valve 122 is opened may be varied with respect to piston TDC by an intake cam phasor 148. The time at which the exhaust valve 130 is opened may be varied with respect to piston TDC by an exhaust cam phasor 150. A phasor actuator module 158 controls the intake cam phasor 148 and the exhaust cam phasor 150 based on signals from the control module 114.

The control system 100 may include a boost device that provides pressurized air to the intake manifold 110. For example, FIG. 1 depicts a turbocharger 160. The turbocharger 160 is powered by exhaust gases flowing through the exhaust system 101, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The control module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 101. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 105 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The control module 114 may use signals from the sensors to make control decisions for the engine system 100.

The control module 114 may communicate with a transmission control module 194 to coordinate shifting gears in a transmission (not shown). For example, the control module 114 may reduce torque during a gear shift. The control module 114 may communicate with a hybrid control module 196 to coordinate operation of the engine 105 and an electric motor 198. The electric motor 198 may also function as a generator, and may be used to produce electrical energy for use by vehicle electrical systems and/or for storage in a battery. In various implementations, the control module 114, the transmission control module 194, and the hybrid control module 196 may be integrated into one or more modules.

The combined torque of engine 105 and electric motor 198 is applied to an input of transmission 202. Transmission 202 may be an automatic transmission that switches gears in accordance with a gear change command from the control module 114. An output shaft of transmission 202 is coupled to an input of a differential gear 204. Differential gear 204 drives axles and wheels 200. Wheel speed sensors 206 generate signals that indicate a rotation speed of their respective wheels 200.

The control module 114 estimates an engine output torque to provide based on received sensor signals and other parameters described herein. The control module 114 may adjust a position of the throttle, air-fuel ratio, valve timing, fuel injection, etc. to provide the estimated engine output torque. Based on a desired engine output torque, a desired air flow, a desired fuel injection, and/or a desired spark timing is achieved. The desired engine output torque may be based on a vehicle operator (driver) request and/or may be controller based, such as a torque output request from a cruise control system. In particular, the control module 114 controls the torque output of the engine based on the coordinated torque control methods and systems of the present disclosure.

The sensor signals that are received by the control module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 199, and a vehicle speed sensor 201.

The control module 114 communicates with the throttle actuator module 116. The control module 114 receives a throttle position signal from the throttle position sensor 190 and adjusts throttle position based on the throttle position signal. The control module 114 may control the throttle 112 using a throttle actuator based on a position of an accelerator pedal 193.

Air mass, volume, and pressure per cylinder may be determined and/or estimated based on signals from the sensors 184, 186. The control module 114 may adjust engine and exhaust system devices based on a desired MAP and a desired MAF. The desired MAP and MAF may be determined based on engine speed and torque request signals.

The engine system 100 may further include other sensors 218, such as exhaust flow sensors 220, an EGR sensor 222, environmental sensors 224, an oxygen sensor 226, and engine sensors 230 not mentioned above. The environmental sensors 224 may include an altitude sensor, the ambient temperature sensor 197, a barometric pressure sensor, and an air flow sensor. The sensors 218-230 may be used to determine engine and environmental conditions, which may be further used to adjust the valves of the valve assembly 104, to adjust current and/or voltage of a heater assembly 251, and/or to determine a desired throttle area. The desired throttle area may correspond to a specific throttle position.

The engine system 100 may also include memory 240, which may be used when adjusting the valve assembly 104 and/or when performing various functions associated with the control module 114. The memory 240 may include various tables 242, which may include predetermined exhaust temperature values, predetermined environmental condition values, correction factors, coefficient values, etc. for regeneration of the PF 103. The contents of the memory 240 may be associated with one or more of the steps described with respect to the methods described below.

Figure 6:
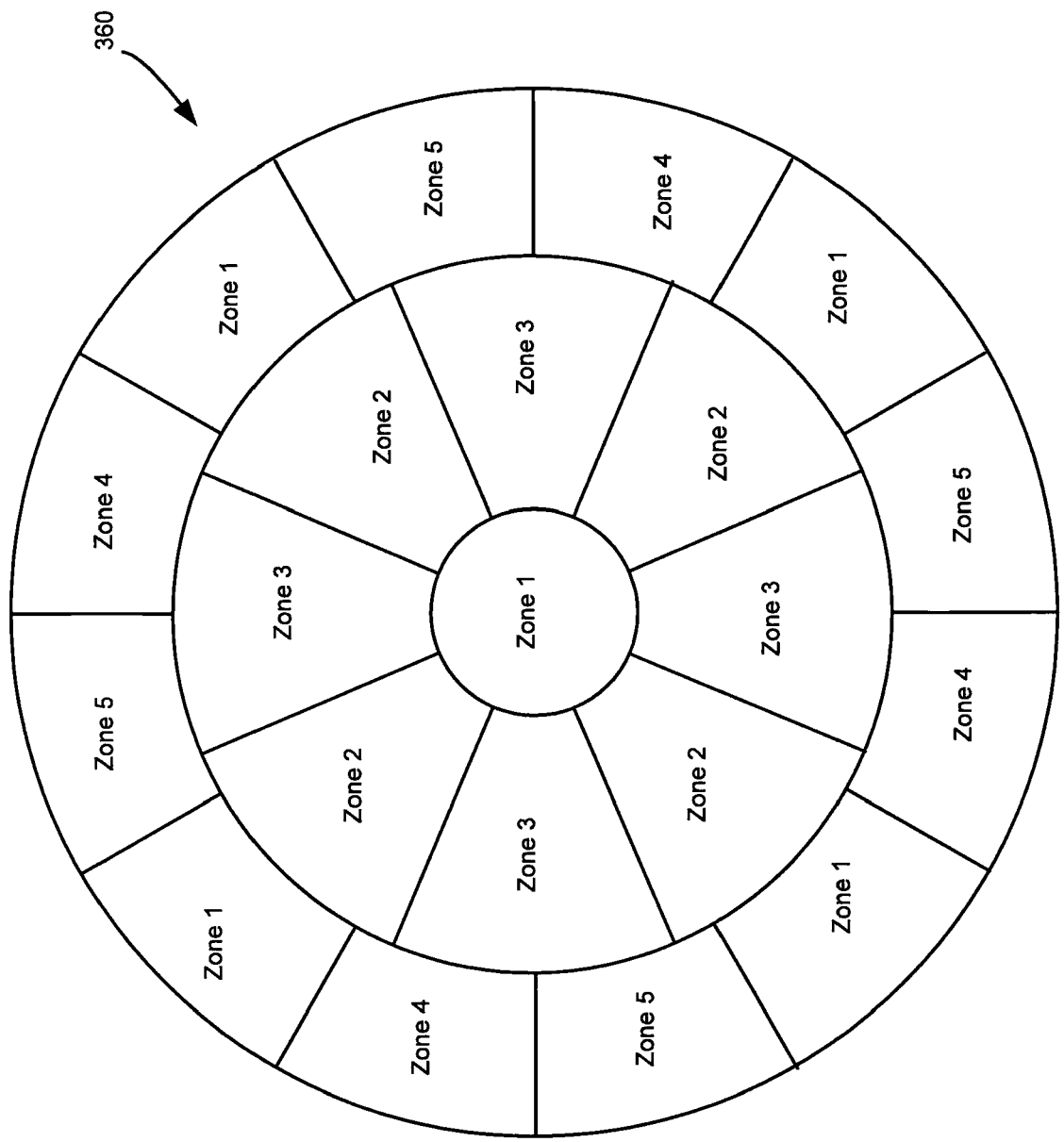
FIG. 6 illustrates exemplary zoning of a zoned inlet heater assembly.
Figure 7:
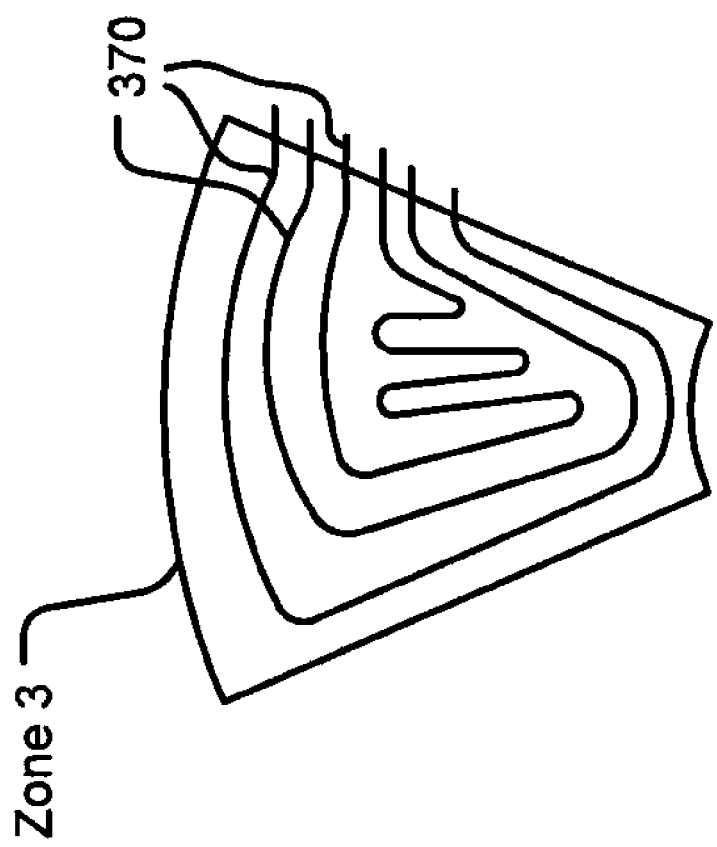
FIG. 7 illustrates an exemplary resistive heater elements for one of the zones of the zoned inlet heater of FIG. 6.

The exhaust system 101 includes the PF 103, the oxidation catalyst 135, an exhaust manifold 250, and the heater assembly 251 with one or more heater elements. Optionally, an EGR valve (not shown) re-circulates a portion of the exhaust back into the intake manifold 110. The remainder of the exhaust is directed into the turbocharger 160 to drive a turbine. The turbine facilitates the compression of the fresh intake air. Exhaust flows from the turbocharger 160 through the oxidation catalyst 135 and into the PF 103. The oxidation catalyst 135 oxidizes the exhaust based on a post combustion air/fuel ratio. The amount of oxidation increases the temperature of the exhaust. The PF 103 receives exhaust from the oxidation catalyst 135 and filters any soot particulates present in the exhaust. The valve assembly 104 is used to adjust exhaust flow in areas of the PF 103 during regeneration of the PF 103. Example valve assemblies are shown in FIGS. 3A-4E. The heater assembly 251 is used to heat the soot to a regeneration temperature. Example heater elements and heater assemblies are shown in FIGS. 5-7.

The control module 114 controls the engine and regeneration of the PF 103 based on various sensed information and soot loading. More specifically, the control module 114 estimates loading of the PF 103. When the estimated loading is at a predetermined level and/or the exhaust flow rate is within a desired range, regeneration may be enabled. The duration of the regeneration process may be varied based upon the estimated amount of particulate matter within the PF 103.

During regeneration soot in the PF 103 is ignited. The ignited soot may be partially or fully extinguished due to high exhaust flow rates. The valve assembly 104 is used to restrict the flow of exhaust in selected areas of the PF 103. This allows a regeneration process to occur in the selected areas without extinguishing the ignited soot. The heater assembly 251 is used to ignite the soot. Heat generated by the heater assembly 251 causes soot in selected areas of the PF 103 to reach a point of ignition (light-off) and thus start regeneration. The ignition of the soot creates an exotherm that propagates along the PF 103 and heats soot downstream, continuing the regeneration process.

The engine system 100 may include exhaust system sensors, such as the exhaust flow sensors 220, exhaust pressure sensors 252, 254, an exhaust temperature sensor 256, etc. for determining exhaust flow levels, exhaust temperature levels, exhaust pressure levels, etc. The control module 114 may adjust valves of the valve assembly 104 and/or current and voltage of the heater assembly 251 based on signals from the sensors 220, 252, 254, 256.

The PF 103 may have an associated predetermined regeneration temperature operating range, a predetermined regeneration operating temperature, and/or a predetermined peak operating temperature. The peak operating temperature may be associated with a point of potential degradation. For example, a PF may begin to breakdown at operating temperatures greater than 800° C. The peak operating temperature may vary for different PFs. The peak operating temperature may be associated with an average temperature of a portion of a PF or an average temperature of the PF as a whole.

To prevent damage to a PM filter, and increase the operating life of the PM filter, the embodiments of the present disclosure may adjust PM filter regeneration based on soot loading. A target maximum operating temperature is set for a PM filter. Regeneration is performed when soot loading is less than or equal to a soot loading level associated with the maximum operating temperature. The regeneration may be performed when soot loading levels are low or within a predetermined range. The predetermined range has an upper soot loading threshold $S_{ut}$ that is associated with the maximum operating temperature. Limiting peak operating temperatures of a PM filter minimizes pressures in and expansion of the PM filter. In one embodiment, soot loading is estimated and regeneration is performed based thereon. In another embodiment, when soot loading is greater than desired for regeneration, mitigation strategies are performed to reduce PM filter peak temperatures during regeneration.

Soot loading may be estimated and/or predicted from parameters, such as mileage, exhaust pressure, exhaust drop off pressure across a PM filter, etc. Mileage refers to vehicle mileage, which can be used to estimate vehicle engine operating time and/or the amount of exhaust gas generated. For example only, regeneration may be performed when a vehicle has traveled approximately 200-300 miles. The amount of soot generated typically depends upon the amount of vehicle loading and use over time. At idle speeds, less soot is generated than when operating at higher speeds. The amount of exhaust gas generated is related to the state of soot loading in the PM filter.

Exhaust pressure can be used to estimate the amount of exhaust generated over a period of time. Regeneration may be performed when an exhaust pressure exceeds a predetermined level. For example when exhaust pressure entering a PM filter exceeds a predetermined level, regeneration may be performed. As another example when exhaust pressure exiting a PM filter is below a predetermined level, regeneration may be performed.

Exhaust drop off pressure may be used to estimate the amount of soot in a PM filter. For example, as the drop off pressure increases the amount of soot loading increases. The exhaust drop off pressure may be determined by determining pressure of exhaust entering a PM filter minus pressure of exhaust exiting the PM filter. Exhaust system pressure sensors may be used to provide these pressures.

A predictive method may include the determination of one or more engine operating conditions, such as engine load, fueling schemes, fuel injection timing, and exhaust gas recirculation (EGR). A cumulative weighting factor may be used based on the engine conditions. The cumulative weighting factor is related to soot loading. When the cumulative weighting factor exceeds a threshold, regeneration may be performed.

Based on the estimated soot loading and a predetermined peak operating temperature for a PM filter, regeneration is performed to prevent the PM filter from operating at temperatures above the peak operating temperature.

Designing a control system to target a selected soot loading allows PM filter regenerations without intrusive controls. A robust regeneration strategy as provided herein, removes soot from a PM filter while limiting peak operating temperatures. Limiting of peak operating temperatures reduces thermal stresses on a substrate of a PM filter and thus prevents damage to the PM filter, which can be caused by high soot exotherms. As a result, durability of the PM filter is increased.

When soot loading is greater than a threshold level associated with a set peak regeneration temperature, mitigation strategies may be performed to reduce PM filter peak temperatures during regeneration. For example, when a maximum soot loading threshold is set at approximately 2 g/l and current soot loading is 4 g/l, to minimize temperatures within a PM filter during regeneration, engine operation is adjusted. The adjustment may include oxygen control and exhaust flow control.

Soot loading may be greater than an upper threshold level, for example, when an engine is operated to receive a high intake air flow rate for an extended period of time. Such operation may occur on a long freeway entrance ramp or during acceleration on a freeway. As another example, a soot loading upper threshold may be exceeded when a throttle valve of an engine is continuously actuated between full ON and full OFF for an extended period of time. High air flow rates can prevent or limit regeneration of a PM filter.

A large increase in exhaust flow can aid in distinguishing or minimizing an exothermic reaction in a PM filter. Exhaust flow control may include an increase in exhaust flow by a downshift in a transmission or by an increase in idle speed. The increase in engine speed increases the amount of exhaust flow.

Figure 2:
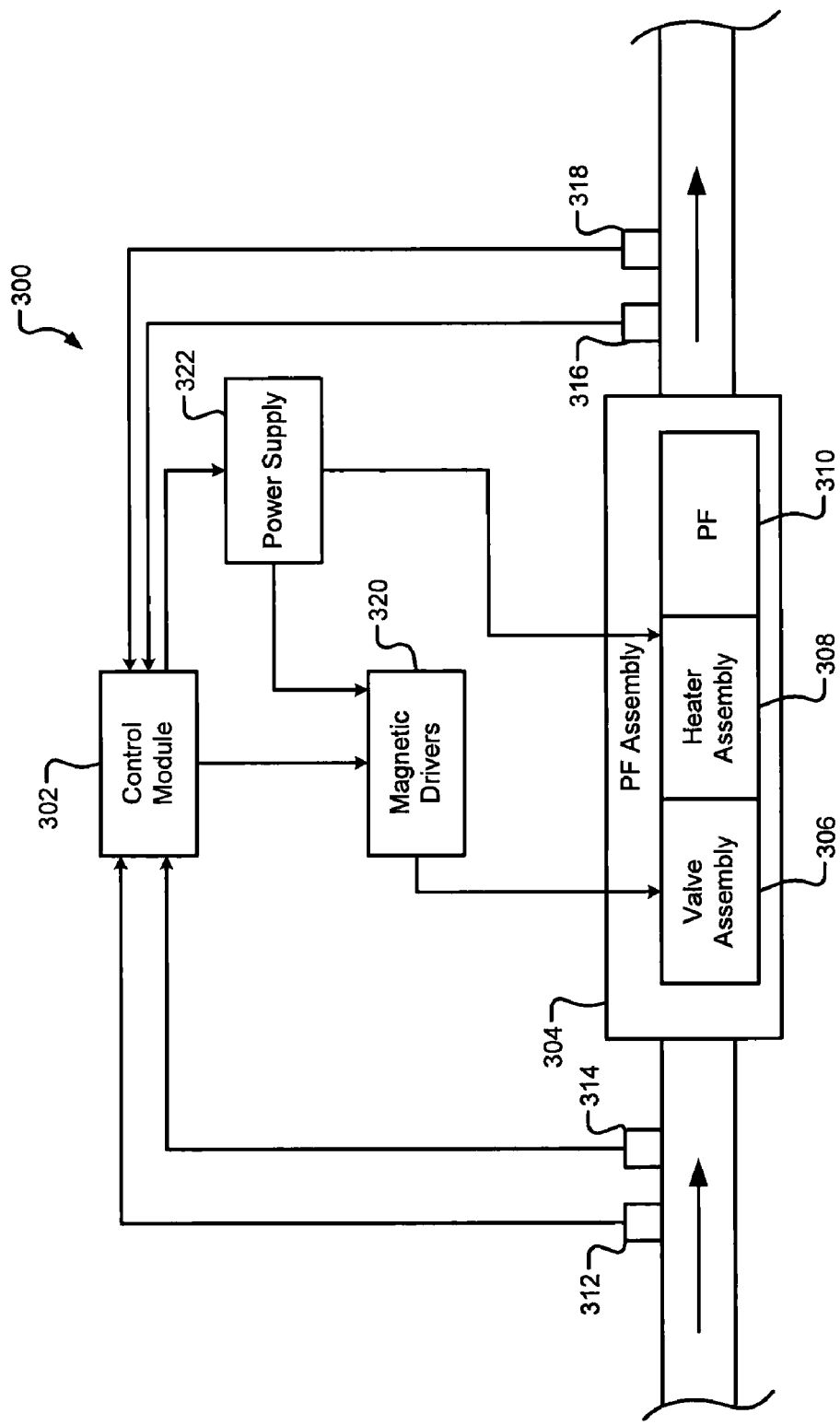
FIG. 2 is a functional block diagram of a regeneration system in accordance with an embodiment of the present disclosure.

Referring now to FIG. 2, a regeneration system 300 is shown. The regeneration system 300 may replace the regeneration system 102 and/or may be included in and/or combined with the regeneration system 102. The regeneration system 300 includes a control module 302, and a PF assembly 304.

The PF assembly 304 includes a valve assembly 306, a heating element assembly 308, and a PF 310. The valve assembly 306 is used to adjust exhaust flow in selected areas of the PF 310. Example valve assemblies are shown in FIGS. 3A-4E. The heating element assembly 308 is used to heat selected areas of the PF 310. Example heating elements and heating element assemblies are shown in FIGS. 5-7.

The control module 302 controls the valve assembly 306 and the heating element assembly 308 based on, for example, signals received from sensors disclosed herein. For example, the regeneration system 300 may include one or more sensors, such as an inlet pressure sensor 312, an inlet temperature sensor 314, an outlet pressure sensor 316, and an outlet temperature sensor 318. Additional sensors are disclosed in FIG. 1.

The control module 302 may adjust valves of the valve assembly via magnetic drivers 320. The magnetic drivers 320 may receive power from a power supply 322. The magnetic drivers 320 may be part of the control module 302 or may be stand alone drivers, as shown.

Referring now to FIGS. 3A and 3B, side and front views of a valve and heater element assembly 330 in accordance with an embodiment of the present disclosure is shown. The valve and heater element assembly 330 includes a valve assembly 331, a spacer 332, and a heater element assembly 333. The spacer 332 separates the valve assembly 331 from the heater element assembly 333. The width W of the spacer 332 may be adjusted based on the configurations of the valve and heater element assemblies 331, 333, and current and voltages applied to the valve and heater element assemblies 331, 333.

The valve assembly 331 includes valves or louvers 334 that each rotate about a respective valve rod 335. The louvers 334 may be formed of or coated with a material that reflects heat energy. For example, a reflective coating may be applied on the downstream side, for example side 336, of the louvers 334 that faces a PF 339. This facilitates ignition and aids in maintaining the temperature of the soot. The louvers 334 enable robust regeneration over a wide range of exhaust flows. The valve assembly 331 may include any number of louvers, which may be arranged in rows and/or columns. The louvers 334 may be each opened, closed, and/or position adjusted via one or more magnets. In the example embodiment shown, each louver 334 has an associated upper electromagnet 337 and a lower permanent magnet stop 338. The louvers 334 may be divided into sections or zones that correspond with zones and/or areas of the heater assembly 333 and the PF.

The louvers 334 may be opened and/or closed by providing current to either the electromagnets 337 or the permanent magnet stops 338. Each of the louvers 334 may thus have a fully closed position (when the louvers are in contact with the electromagnets), a fully open position (when the louvers are in contact with the permanent magnet stops), or may be variably adjusted to a position between fully closed and fully open. Current may be applied to both the electromagnets 337 and the permanent magnet stops 338 to provide partially open or partially closed positions. The louvers 334 may be adjusted to any position between the fully closed and fully open positions. The louvers 334 may be opened, closed, or position adjusted individually, in groups, and/or with respect to selected areas and/or zones of the PF. Each louver 334 may have any number of associated magnets, electromagnets, permanent magnets, etc.

The louvers may have a normally open or a normally closed state. Associated magnets may have normally magnetized or normally demagnetized states that are associated with the normally open or closed states. The term normally refers to a default state or state when the corresponding regeneration system is depowered and/or when regeneration is not being performed.

The heater element assembly 333 includes one or more heater elements 340. The heater elements are located downstream from the valve assembly 331 and are arranged over a front surface of the PF.

In operation, a front area of the PF may be selected. Louvers associated with the selected front area may be partially or fully closed based on exhaust flow or signals from sensors disclosed herein. Current may be applied to the heater elements associated with the selected area to initiate regeneration. Examples of zoned selection are shown in FIGS. 4A-E.

Although the embodiment of FIGS. 3A and 3B include the use of magnetically adjusted flapper valves or louvers, other valves may be used. The valves may include bimetal devices or other mechanical and electrical actuators and activators.

Figure 4B:
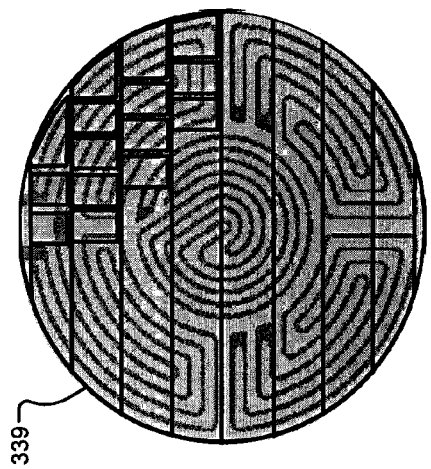
FIG. 4A-E are front views illustrating zoned operation of the valve assembly of FIG. 3A.
Figure 4E:
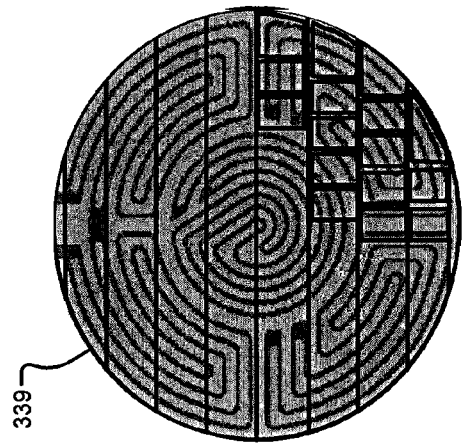
Figure 4C:
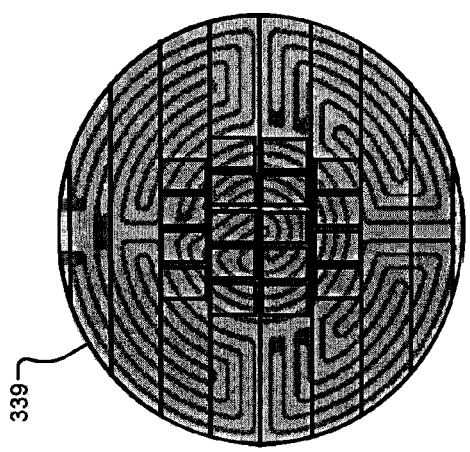
Figure 4A:
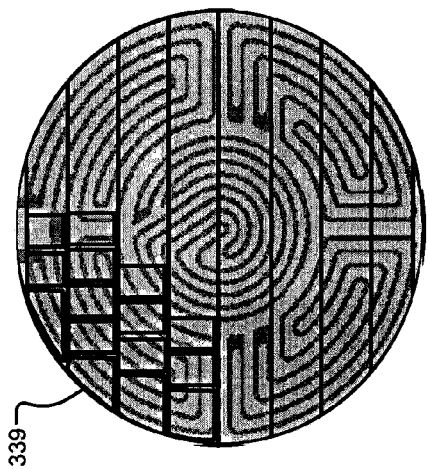
Figure 4D:
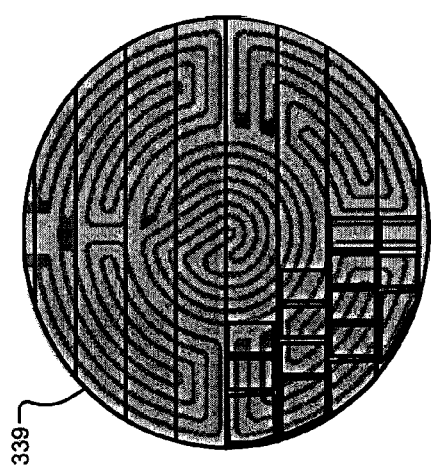

Referring now to FIG. 4A-E, are front views illustrating zoned operation of the valve assembly 331 of FIG. 3A. FIG. 4A illustrates the closing of an upper left zone of louvers. The heating elements that are located behind or downstream from the louvers in the upper left zone may be activated. FIG. 4B illustrates the closing of an upper right zone of louvers. The heating elements that are located behind or downstream from the louvers in the upper right zone may be activated. FIG. 4C illustrates the closing of a center zone of louvers. The heating elements that are located behind or downstream from the louvers in the center may be activated. FIG. 4D illustrates the closing of a lower left zone of louvers. The heating elements that are located behind or downstream from the louvers in the lower left zone may be activated. FIG. 4E illustrates the closing of a lower right zone of louvers. The heating elements that are located behind or downstream from the louvers in the lower right zone may be activated.

Referring now to FIG. 5, exemplary zoning of a zoned inlet heater assembly 350 is shown. An exemplary zoned inlet heater assembly 350 is arranged upstream from a PM filter assembly 352. The PM filter assembly 352 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PF that are not downstream from an activated zone act as stress mitigation zones. For example in FIG. 5, sub-zones 1A, 1B and 1C are activated and sub-zones 2A, 2B, 2C, 3A, 3B, and 3C act as stress mitigation zones.

The corresponding portions of the PM filter downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Referring now to FIG. 6, exemplary zoning of a zoned inlet heater assembly 360 is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Referring now to FIG. 7, an exemplary resistive heater elements 370 are shown. The heater elements 370 may be arranged adjacent to one of the zones (e.g. zone 3) from the first circumferential band of zones in FIG. 6. The heater elements 370 may include one or more coils, heater segments, or conductive elements that cover the respective zone to provide sufficient heating.

Figure 8:
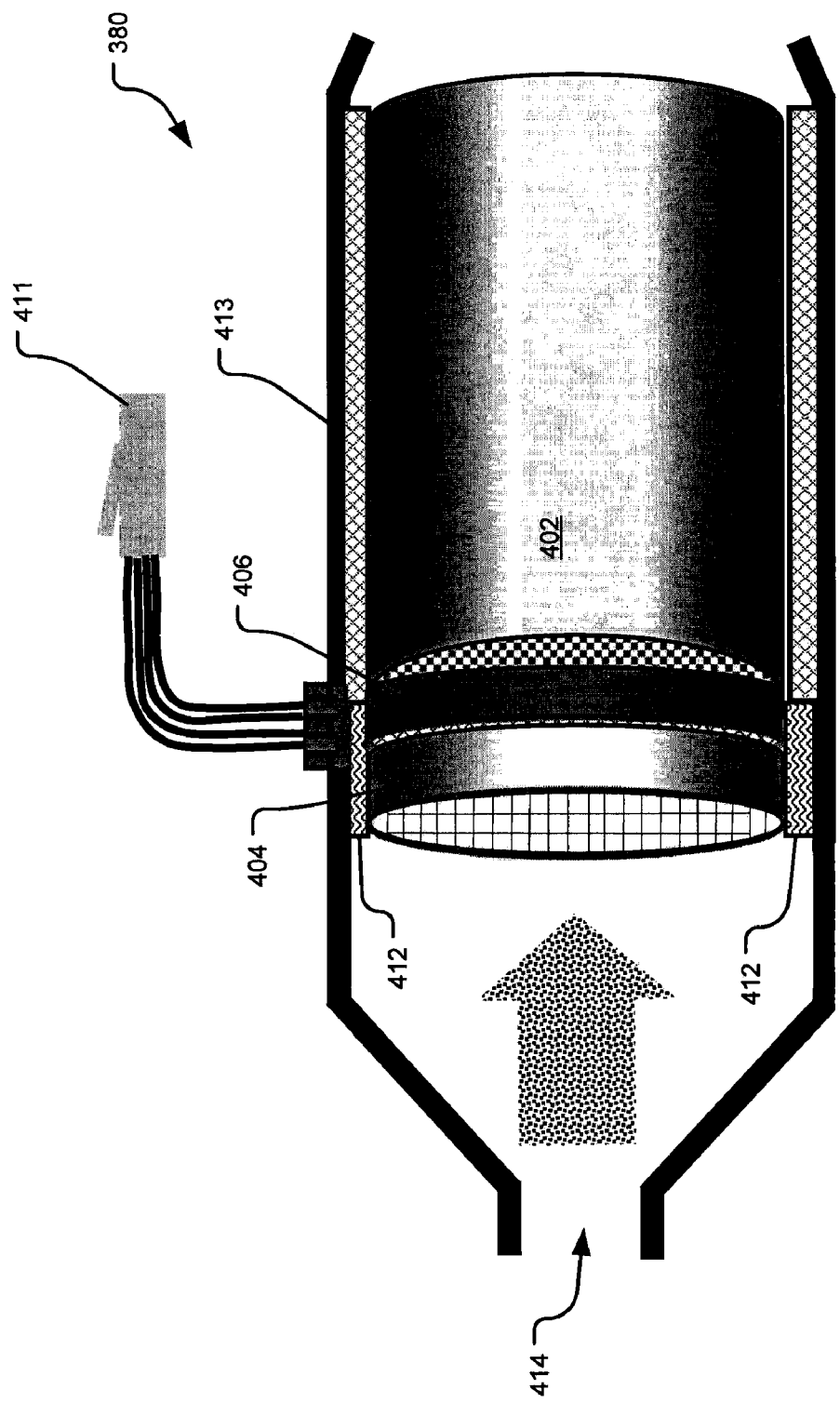
FIG. 8 illustrates an electrically heated PM filter assembly in accordance with an embodiment of the present disclosure.

Referring now to FIG. 8, an electrically heated PM filter assembly 380 is shown. The PM filter assembly 380 includes a housing 400, a filter 402, a valve assembly 404, and a heater assembly 406. The heater assembly 406 is arranged between the valve assembly 404 and a substrate of the filter 402. A diesel oxidization catalyst (DOC) may be incorporated between the Valve assembly 404 and the heater assembly 406. An electrical connector 411 may provide current to the zones of the valve assembly 404 and zones of the heater assembly 406, as described above.

As can be appreciated, the heater assembly 406 may be in contact with or spaced from the filter 402 such that the heating is convection and/or conduction heating. Insulation 412 may be arranged between the heater assembly 406 and a housing 413. Exhaust gas enters the PM filter assembly 380 from an upstream inlet 414 and is heated by one or more zones of the PM filter assembly 380. The heated exhaust gas is received by the filter 402.

Figure 9:
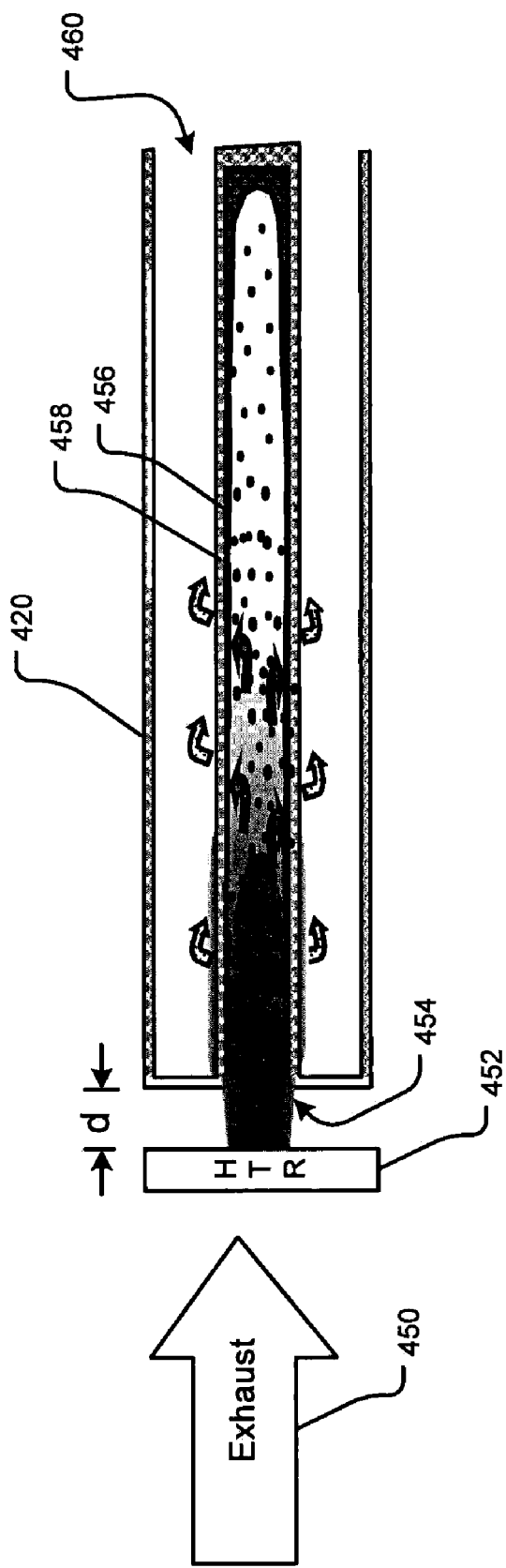
FIG. 9 illustrates heating within a portion of a particulate filter.

Referring now to FIG. 9, heating within a portion of a PF 420 is shown. Exhaust gas 450 passes through a heater 452 and is heated by one or more zones of the heater 452. If spaced from the PF 420, the heated exhaust gas travels a distance "d" and is then received by the PF 420. For example only, the distance "d" may be ½" or less. The PF 420 may have a central inlet 454, a channel 456, filter material 458 and an outlet 460 located radially outside of the inlet. The filter may be catalyzed. The heated exhaust gas causes PM in the filter to burn, which regenerates the PF 420. The heater 452 transfers heat by convection and/or conduction to ignite a front portion of the PF 420. When the soot in the front face portions reaches a sufficiently high temperature, the heater is turned off. Combustion of soot then cascades down the filter channel 456 without requiring power to be maintained to the heater 452.

Figure 10:
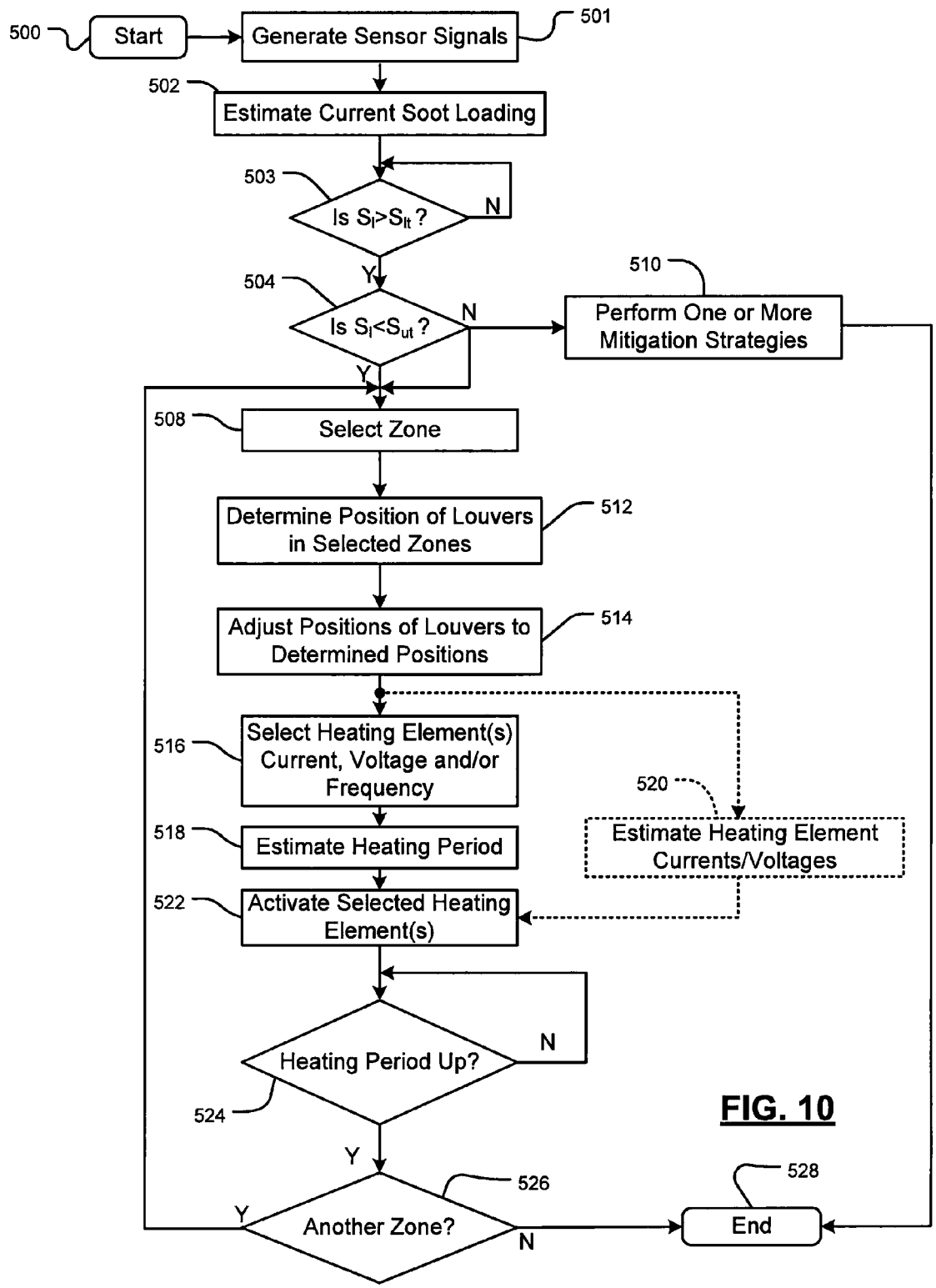
FIG. 10 illustrates a regeneration method in accordance with an embodiment of the present disclosure.

Referring now to FIG. 10, a regeneration method is shown. Although the following steps are primarily described with respect to the embodiments of FIGS. 1-4E, the steps may be easily modified to apply to other embodiments of the present disclosure.

In step 500, control of a control module, such as the control module 114 of FIG. 1, begins and proceeds to step 501. In step 501, sensor signals are generated. The sensor signals may include exhaust flow rate signals, exhaust temperature signals, exhaust pressure signals, an oxygen signal, an intake air flow signal, an intake air pressure signal, an intake air temperature signal, an engine speed signal, an EGR signal, etc., which may be generated by the above-described sensors. The sensor information may be updated throughout this method and the regeneration process and may be detected and/or indirectly estimated.

In step 502, control estimates current soot loading $S_l$ of the PF. Control may estimate soot loading as described above. The estimation may be based on the sensor information, vehicle mileage, exhaust pressures, exhaust drop off pressures across the PM filter, and/or a predictive method. The predictive method may include estimation based on one or more engine operating parameters, such as engine load, fueling schemes, fuel injection timing, and EGR. In step 503, control determines whether the current soot loading $S_l$ is greater than a soot loading lower threshold $S_{lt}$. When the current soot loading $S_l$ is greater than the lower threshold $S_{lt}$ control proceeds to step 504, otherwise control returns to step 502.

In step 504, control determines if regeneration is to be performed based on whether current soot loading $S_l$ is less than a soot loading upper threshold $S_{ut}$. When the current soot loading $S_l$ is less than the upper threshold $S_{ut}$ then control proceeds to step 508. When the current soot loading $S_l$ is greater than or equal to the upper threshold $S_{ut}$ then control proceeds to step 510. A soot loading model may be used when determining when to perform regeneration. In step 510, control performs mitigation strategies as described above to limit peak temperatures in the PF during regeneration. Step 510 is performed while performing regeneration steps 512-524.

If control determines that regeneration is needed in step 504, control selects one or more zones of the PF in step 508. In step 512, control determines position of louvers of a valve assembly, such as the valve assemblies 104, 306 and 331 of FIGS. 1, 2, and 3A-4E. Louvers associated with the selected zones may be partially or fully closed by activation or deactivation of respective magnetic drivers associated with the magnets of the louvers. A predetermined number of louvers may be selected to minimize backpressure increase. Selected louvers are at least partially closed to restrict flow in a flow controlled area, not to completely block the flow. In other words, the louvers when fully closed leak. Louvers that are not associated with the selected zones may be partially or fully opened. The louvers may not completely cover respective openings to allow for leakage of exhaust around the louvers and/or may, for example, be perforated to allow for leakage through the louvers.

The louver positions may be adjusted between different states during regeneration and may be based on the sensor information obtained in step 501 and the current soot loading. The positions may be predetermined and stored in a memory, determined via a look-up table, or determined based on engine operating parameters, some of which are stated herein. In step 514, control adjusts the positions of the louvers based on the determined positions.

In step 516, control selects heating element(s) associated with the selected zones. Control may also select current, voltage and/or frequencies of signals to apply to the heating elements. The current, voltage and frequencies may be predetermined and stored in a memory, determined via a look-up table, or determined based on engine operating parameters, some of which are stated herein. The current, voltage and/or frequencies may be based on the sensor information obtained in step 501 and the current soot loading.

In step 518, control estimates a heating period sufficient to achieve a minimum soot temperature. The minimum soot temperature may be based on at least one of current, voltage, exhaust flow, exhaust temperature and predetermined heating element circuit characteristics, such as heating element length, width, coverage area, heating output, etc. The heating period may also be based on the positions of the louvers, the number and size of the louvers for the selected zone, the reflective characteristics of the louvers, the exhaust leakage associated with each of the louvers. The exhaust leakage referring to the amount of exhaust gas that may pass through and/or around a louver for a particular area when fully closed.

The minimum soot temperature should be sufficient to start the soot burning and to create a cascade effect. For example only, the minimum soot temperature may be set to 700 degrees Celsius or greater. In an alternate step 520 to step 516, control estimates heating element current, voltage and/or frequencies to achieve minimum soot temperatures based on a predetermined heating period, exhaust flows and/or exhaust temperatures.

In step 522, the PF is regenerated by selectively heating one or more of the zones and igniting the soot in the portions of the PF associated with the zones. When soot within the selected zones reaches a regeneration temperature, the selected heating elements may be turned off and the burning soot then cascades down the PF, which is similar to a burning fuse on a firework. In other words, the heating elements may be activated long enough to start the soot ignition and may then be deactivated or may be activated throughout the soot burning process. The louvers are cleaned of particulate matter by the radiant heat energy given off by adjacent heating elements.

In one embodiment, radially outer most zones are regenerated first followed by radially inner zones. The zones may be regenerated in a select, predetermined, sequential, independent, or arbitrary manner. Multiple zones may be selected and heated during the same time period.

In step 524, control determines whether the heating period is up. If step 524 is true, control determines whether additional zones need to be regenerated in step 526. When regeneration is done for a selected zone, the associated louvers or valves may be opened by a combination of exhaust flow and adjustment in current supplied to associated magnets and/or devices of the valves. Respective magnets may be energized or deenergized to open the valves. If step 526 is true, control returns to step 508.

The burning soot is the fuel that continues the regeneration. This process is continued for each heating zone until the PF is completely regenerated. Control ends in step 528.

The above-described steps are meant to be illustrative examples; the steps may be performed sequentially, synchronously, simultaneously, continuously, during overlapping time periods or in a different order depending upon the application.

In use, the control module determines when the PF requires regeneration. The determination is based on soot levels within the PF. Alternately, regeneration can be performed periodically or on an event basis. The control module may estimate when the entire PF needs regeneration or when zones within the PF need regeneration. When the control module determines that the entire PF needs regeneration, the control module sequentially activates one or more of the zones at a time to initiate regeneration within the associated downstream portion of the PF. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

The zoned flow control described-above provides a broader regeneration window using an electrically heated PF. This eliminates the need for post-fuel injected components or fuel heated PF regeneration system components, as an electrically heated PF system may be used during high exhaust flow conditions. The electrically heated PF system may be used over an entire vehicle speed operating range.

The present disclosure provides a low power regeneration technique with short regeneration periods and thus overall regeneration time of a PF. The present disclosure may substantially reduce the fuel economy penalty, decrease tailpipe temperatures, and improve system robustness due to the smaller regeneration time.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a particulate matter (PM) filter that includes X zones, where X is an integer;
an electrical heater that includes Y heater segments associated with respective ones of the X zones, where Y is an integer,
wherein the electrical heater is arranged upstream from and proximate with the PM filter;
a valve assembly comprising
Z sections associated with respective ones of the X zones, where Z is an integer,
a first set of louvers that correspond with a first one of the Z sections, and
a second set of louvers that correspond with a second one of the Z sections; and
a control module that adjusts flow through each of the Z sections during regeneration of the PM filter via control of the valve assembly.

2. The system of claim 1 wherein:
the valve assembly includes a plurality of louvers associated with each of the Z sections;
the plurality of louvers comprise the first set of louvers and the second set of louvers; and
the control module adjusts exhaust flow through a selected one of the Z sections by actuation of respective ones of the louvers that correspond with the selected one of the Z sections.

3. The system of claim 1 wherein the control module opens the first set of louvers during a first period, and then opens the second set of louvers and closes the first set of louvers for a second period.

4. The system of claim 1 wherein the valve assembly comprises:
a plurality of louvers including the first set of louvers and the second set of louvers;
a first set of magnets; and
a second set of magnets,
wherein at least one of the first set of magnets and the second set of magnets is energized to close the plurality of louvers and at least one of the first set of magnets and the second set of magnets are energized to open the plurality of louvers.

5. The system of claim 1 wherein the valve assembly comprises:
a plurality of louvers including the first set of louvers and the second set of louvers;
a first set of magnets; and
a second set of magnets,
wherein at least one of the first set of magnets and the second set of magnets are deenergized to close the plurality of louvers and at least one of the first set of magnets and the second set of magnets are deenergized to open the plurality of louvers.

6. The system of claim 1 wherein the valve assembly comprises a plurality of louvers including the first set of louvers and the second set of louvers,
wherein the plurality of louvers when in an open state permit unrestricted passage of exhaust, and
wherein the plurality of louvers when in a closed state restrict and permit passage of exhaust.

7. The system of claim 1 further comprising:
a power supply; and
magnetic drivers,
wherein the valve assembly includes N louvers and M magnets that correspond with each of the Z sections,
wherein the N louvers include the first set of louvers and the second set of louvers, and where N and M are each integers greater than 1, and
wherein the control module activates selected ones of the M magnets to adjust positions of selected ones of the N louvers that correspond with a selected one of the Z sections by permitting passage of power from the power supply to the magnetic drivers associated with the selected ones of the M magnets.

8. The system of claim 1 wherein the valve assembly comprises louvers that reflect radiant heat energy.

9. The system of claim 1 wherein the valve assembly comprises a plurality of louvers that each have N positions, wherein the plurality of louvers include the first set of louvers and the second set of louvers, and where N is an integer greater than 2, and
wherein the control module selectively arranges the plurality of louvers in one of the N positions.

10. The system of claim 1 wherein the control module adjusts exhaust flow through each of the Z sections based on soot loading of the PM filter.

11. A method comprising:
providing a particulate matter (PM) filter that includes X zones, where X is an integer;
providing an electrical heater that includes Y heater segments associated with respective ones of the X zones, where Y is an integer,
wherein the electrical heater is arranged upstream from and proximate with the PM filter;
providing a valve assembly comprising louvers; and
energizing M magnets to one of close and open the louvers to restrict exhaust flow through a selected one of the X zones during regeneration of the PM filter, where M is an integer greater than 1.

12. The method of claim 11 further comprising:
energizing a first set of the magnets to close the louvers; and
energizing a second set of the magnets to open the louvers.

13. The method of claim 11 wherein:
the valve assembly includes Z sections associated with respective ones of the X zones; and
the method further comprises energizing the M magnets to one of close and open the louvers to restrict exhaust flow through one of the Z sections corresponding to the selected one of the X zones.

14. The method of claim 13 comprising adjusting exhaust flow through a selected one of the Z sections by actuation of respective ones of the louvers that correspond with the selected one of the Z sections.

15. The method of claim 13 comprising:
opening a first set of louvers of the valve assembly during a first period, and then
opening a second set of louvers of the valve assembly and closing the first set of louvers for a second period.

16. The method of claim 13 further comprising energizing a first set of the M magnets to close the louvers of the valve assembly and energizing a second set of the M magnets to open the louvers.

17. The method of claim 13 further comprising deenergizing a first set of the M magnets to close the louvers of the valve assembly and deenergizing a second set of the M magnets to open the louvers.

18. The method of claim 13 further comprising:
providing a power supply;
providing magnetic drivers; and
activating selected ones of the M magnets of the valve assembly to adjust positions of selected ones of the louvers of the valve assembly that correspond with a selected one of the Z sections by permitting passage of power from the power supply to the magnetic drivers associated with the selected ones of the M magnets.

19. The method of claim 13 further comprising selectively arranging each of the louvers of the valve assembly in one of M positions, where M is an integer greater than 2.

20. A system comprising:
a particulate matter (PM) filter that includes X zones, where X is an integer;
a valve assembly comprising
Z sections, wherein each of the Z sections corresponds to respective ones of the X zones, where Z is an integer,
a first set of louvers that correspond with a first one of the Z sections,
a second set of louvers that correspond with a second one of the Z sections, and
magnets configured to open and close the first set of louvers and the second set of louvers; and
a control module that at least one of energizes and deenergizes the magnets to adjust exhaust flow through each of the Z sections during regeneration of the PM filter.

* * * * *